(Model.)

G. BOWEN.
NUT LOCK.

No. 303,801.

Patented Aug. 19, 1884.

WITNESSES:
Chas. Nida
C. Sedgwick

INVENTOR:
G. Bowen
BY Munn & Co.
ATTORNEYS.

UNITED STATES PATENT OFFICE.

GWILYM BOWEN, OF MURPHYSBOROUGH, ILLINOIS.

NUT-LOCK.

SPECIFICATION forming part of Letters Patent No. 303,801, dated August 19, 1884.

Application filed March 28, 1884. (Model.)

*To all whom it may concern:*

Be it known that I, GWILYM BOWEN, of Murphysborough, in the county of Jackson and State of Illinois, have invented a new and Improved Nut-Lock, of which the following is a full, clear, and exact description.

The invention consists in the construction hereinafter described and claimed.

Reference is to be had to the accompanying drawings, forming part of this specification, in which similar letters of reference indicate corresponding parts in all the figures.

Figure 1:
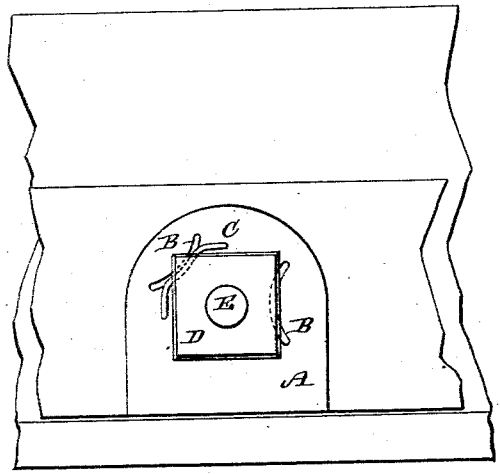
Figure 2:
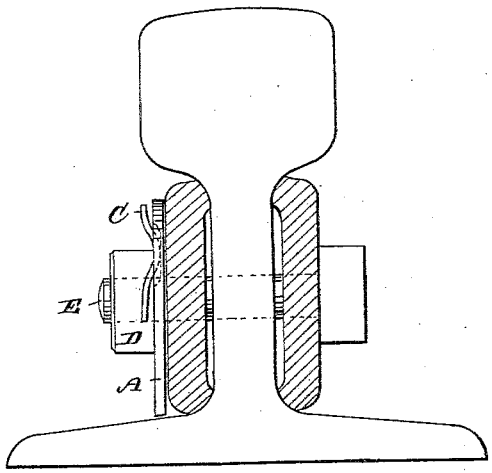
Figure 3:
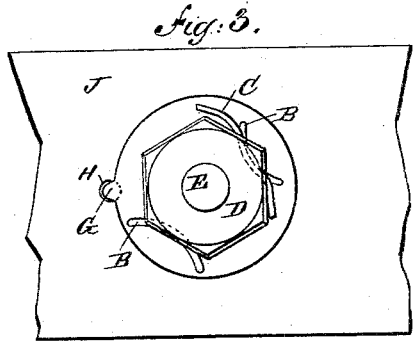
Figure 4:
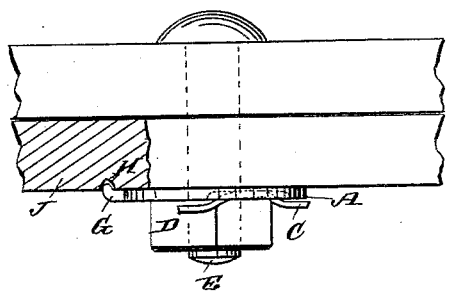

Figure 1 is a face view of my improved nut-lock applied to a railway and fish bar. Fig. 2 is a side view of the same, the fish-bars being in section. Fig. 3 is a face view of the same, showing a modification of the washer; Fig. 4, a plan view of the same.

The washer A is provided in its outer surface with two segmental grooves, B, which are so arranged that their convex edges face the central hole in the washer. The grooves are arranged at such a distance from the hole in the washer that the nut can overlap the middle parts of the said grooves. It will be noticed that these grooves are inclined at their ends, (see Figs. 2 and 3,) and are entirely within the circumference of the washer. The object of this is as follows: When the pin is driven in place between the nut and washer and through the groove, the inclined ends of the groove will cause the ends of the pin to be bent upward beyond the face of the washer, so that no implement is necessary to bend the ends of the pin out of the slot, as has been necessary in a previous construction, and it is not necessary to bend one end of the pin before inserting it, as has been done heretofore. When the pin is properly driven into place, both ends will project up beyond the face of the washer, when they may be struck a light blow by any suitable instrument, and be thereby bent against the edges of the nut, as shown.

The under or inner face of the nut is made plain or without grooves, and is retained in place by the upturned ends of the key or pin. The nut is drawn down tightly on the washer, and then a piece of untempered steel wire, C, is passed into that groove B that is overlapped by one angle or corner of the nut. The said piece of wire forms a key, which prevents the nut from turning without also turning the washer. It is necessary, in order to prevent the loosening of the nut, to prevent the washer from revolving, as when the washer is locked the nut is locked with it. If a square-edge or square-bottom washer is used, as shown in Figs. 1 and 2, the straight edge of the washer resting against the base of the rail or any other projection, the washer will be prevented from revolving and the nut is locked in place. If a circular washer is used, as shown in Figs. 3 and 4, the said washer must be provided with a tongue or projection, G, which can be forced into an opening, H, in the plate J, against which the washer rests. If an angular washer is used and no projections, flanges, bases, &c., are provided, against which one edge of the washer can rest, the washer must be held in a fixed position in the manner shown in Figs. 2 and 3, or in any other suitable manner. The hole in the washer must be of sufficient size to let the bolt pass, but no larger, so that the nut cannot have any play.

I am aware that a nut-lock has heretofore been constructed in which the washer was provided with a curved groove extending across its face and below the hole in said washer; also, that a fish-bar has been provided with a longitudinal groove to receive a wire to lock the nuts of the bolts that pass through said plate; also, that a washer has been provided with parallel straight grooves near its opposite edges, said grooves being intersected by a short groove at right angles to them, and I do not desire to claim any such construction as of my invention.

Having thus described my invention, what I claim as new, and desire to secure by Letters Patent, is—

The combination, with the bolt E and the nut D, having a plain inner surface, of the washer A, provided with the curved grooves B B, having inclined ends, as shown, and formed entirely within the circumference of the washer, whereby when a locking-pin is forced through one of said grooves its ends will be bent outward beyond the face of the washer, substantially as set forth.

GWILYM BOWEN.

Witnesses:
THOMAS H. JONES,
JAS. H. MARTIN.